Sept. 13, 1932.  E. R. GREER  1,877,126
TRACTOR HITCH
Filed Oct. 3, 1928  3 Sheets-Sheet 1

Inventor
EDWARD R. GREER
By Paul, Paul & Moore
ATTORNEYS

Sept. 13, 1932.   E. R. GREER   1,877,126
TRACTOR HITCH
Filed Oct. 3, 1928   3 Sheets-Sheet 2

Inventor
EDWARD R. GREER
By Paul, Paul & Moore
ATTORNEYS

Sept. 13, 1932.   E. R. GREER   1,877,126
TRACTOR HITCH
Filed Oct. 3, 1928   3 Sheets-Sheet 3

Inventor
EDWARD R. GREER
By Paul, Paul & Moore
ATTORNEYS

Patented Sept. 13, 1932

1,877,126

UNITED STATES PATENT OFFICE

EDWARD R. GREER, OF MINNEAPOLIS, MINNESOTA

TRACTOR HITCH

Application filed October 3, 1928. Serial No. 309,998.

This invention relates to new and useful improvements in tractor hitches, and an object of the invention is to provide such a hitch having means for connecting an ordinary type of tractor to a semi-trailer in such a manner that the forward portion of the trailer will be carried upon the tractor at a point rearwardly of the rear axle thereof, so that the weight of the forward end of the trailer will counterbalance the weight of the forward end of the tractor, thereby increasing the weight or load on the tractor drive wheels for the purpose of improving traction, and whereby the front wheels may also be eliminated, the tractor being provided with suitable means for guiding it.

A further object of the invention is to provide a tractor hitch comprising a fifth wheel located rearwardly of the tractor drive axle, and in such a manner that the weight of the forward end of the trailer, when the latter is connected to the tractor, will counterbalance the forward end of the tractor, so that the front wheels may be eliminated and whereby the tractor and trailer will be converted into a four-wheeled vehicle or apparatus, the tractor being provided with means for guiding or steering the apparatus.

A further object is to provide a tractor hitch comprising means for cushioning the loads and strains occurring between the tractor and trailer.

A further object is to provide a tractor hitch including a member adapted to be secured to a semi-trailer, and a frame adapted to be secured to the tractor and having a pivotal connection with the trailer member, and spring elements being provided for cushioning the trailer load upon the tractor and also permitting the tractor wheels to follow the contour of the ground, without imparting unnecessary strains to the forward end of the trailer.

A further object is to provide a tractor hitch for connecting the forward end of a semi-trailer to a tractor having no front wheels, whereby the trailer and tractor will provide a four-wheeled vehicle, having the power and steering control applied to the front wheels thereof, which renders the apparatus more easily guided whether traveling in a backward or forward direction. Also because the driving power is applied to the forward wheels of the apparatus (rear wheels of the tractor), the direction of movement of the apparatus is sure to be according to the direction of the travel of the power wheels, thereby avoiding all danger of the tractor "bucking" or failing to steer properly, which often results when guiding an ordinary four-wheeled tractor in loose or rough ground.

A further object is to provide a tractor hitch for connecting together a tractor and semi-trailer, which will positively prevent the forward end of the tractor from "rearing up", thereby rendering the apparatus safer to operate.

A further object is to provide a tractor hitch for connecting together the forward end of a semi-trailer and the rear portion of a tractor, which is so arranged that the front wheels of the tractor may be removed, the weight of the forward end of the trailer counterbalancing the weight of the forward end of the tractor, and a suitable shoe or skid being secured to the forward end of the tractor adapted to prevent the forward end of the tractor from being damaged as a result of encountering obstacles in the path of the tractor, and which shoe also functions as a means for spreading a pile of loose dirt or gravel positioned in front of the tractor wheels, whereby the latter may readily pass thereover.

The particular object of the invention therefore is to provide an improved tractor hitch which is an improvement over the form shown in my prior pending application, Serial No. 29,129, filed May 9, 1925, now Patent No. 1,799,846, dated April 7, 1931.

Further objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification.

Figure 6 is a detailed sectional view on the line 6—6 of Figure 2; and

Figure 7 is a diagrammatic plan view, showing the relative positions of the tractor and the trailer when turning.

Figure 1:
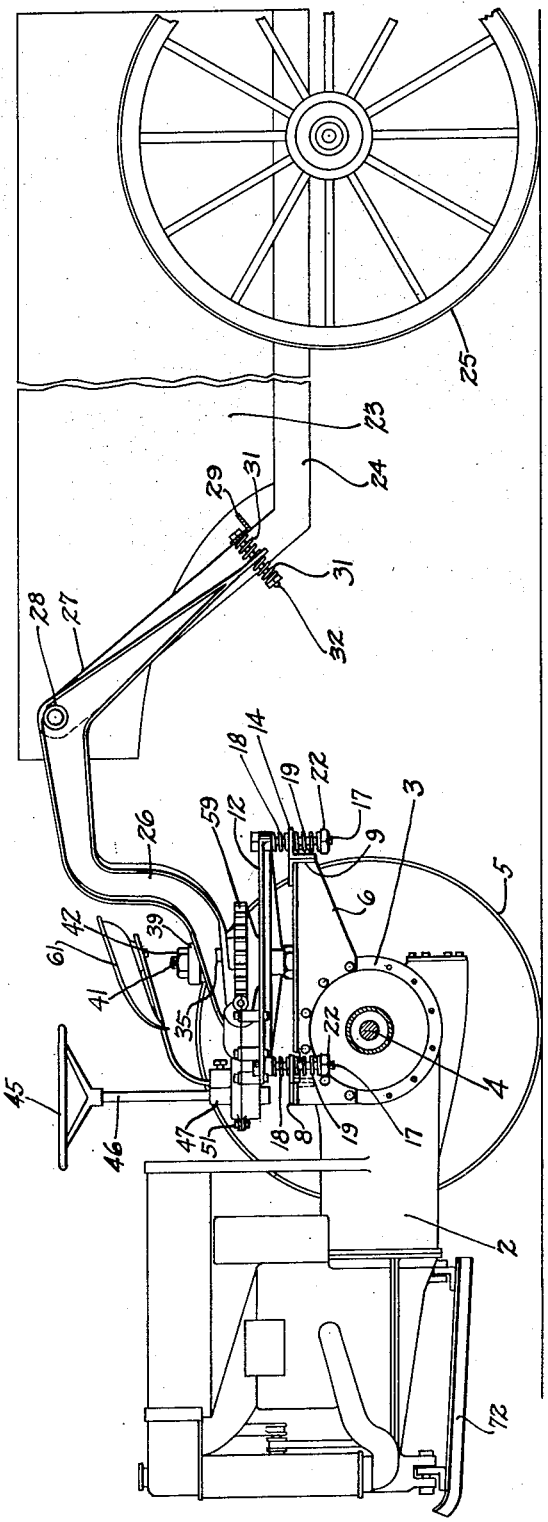
Figure 1 is a side elevation showing a conventional type of tractor having a semi-trailer connected therewith by means of my invention.

In the selected embodiment of the invention here shown, for purposes of disclosure, there is illustrated a tractor comprising the usual body 2, rear housing 3, axle 4, and the rear drive wheels 5.

Brackets 6 are secured to the rear housing 3 of the tractor by means of the bolts 7, usually provided for securely bolting together the opposed sections of the rear axle housing 3 and the differential housing interposed therebetween. A cross member 8 is secured to the forward ends of the brackets 6, and a similar cross member 9 is secured to the rear end portions of the brackets 6. The cross members 8 and 9 are preferably of angle iron cross section, and are secured to the brackets 6 by such means as rivets 11, shown in Figure 3.

Figures 4, 5:
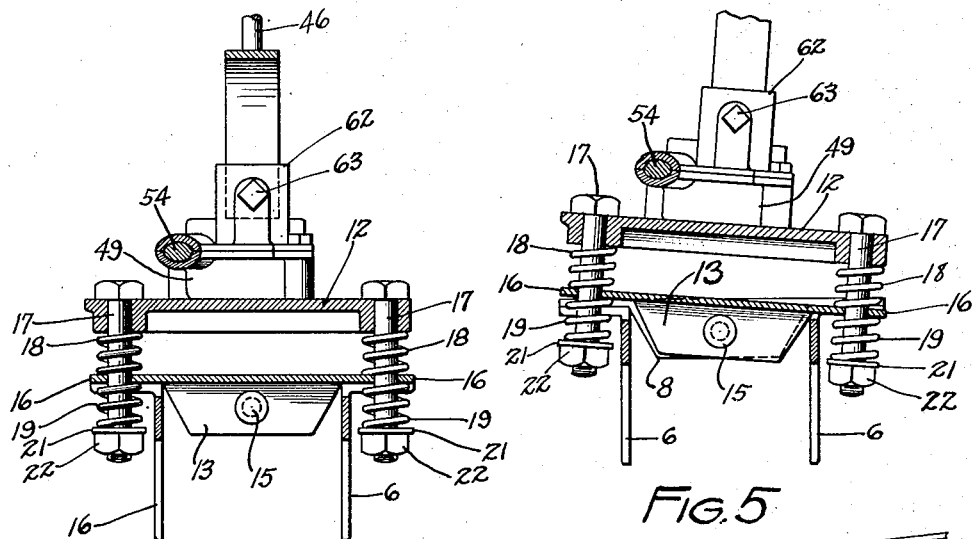
Figure 4 is a detailed sectional view on the line 4—4 of Figure 3, showing the parts in normal position.
Figure 5 is a similar view, showing the position of the parts when the rear axle of the tractor is tilted to an angular position.
Figure 3:
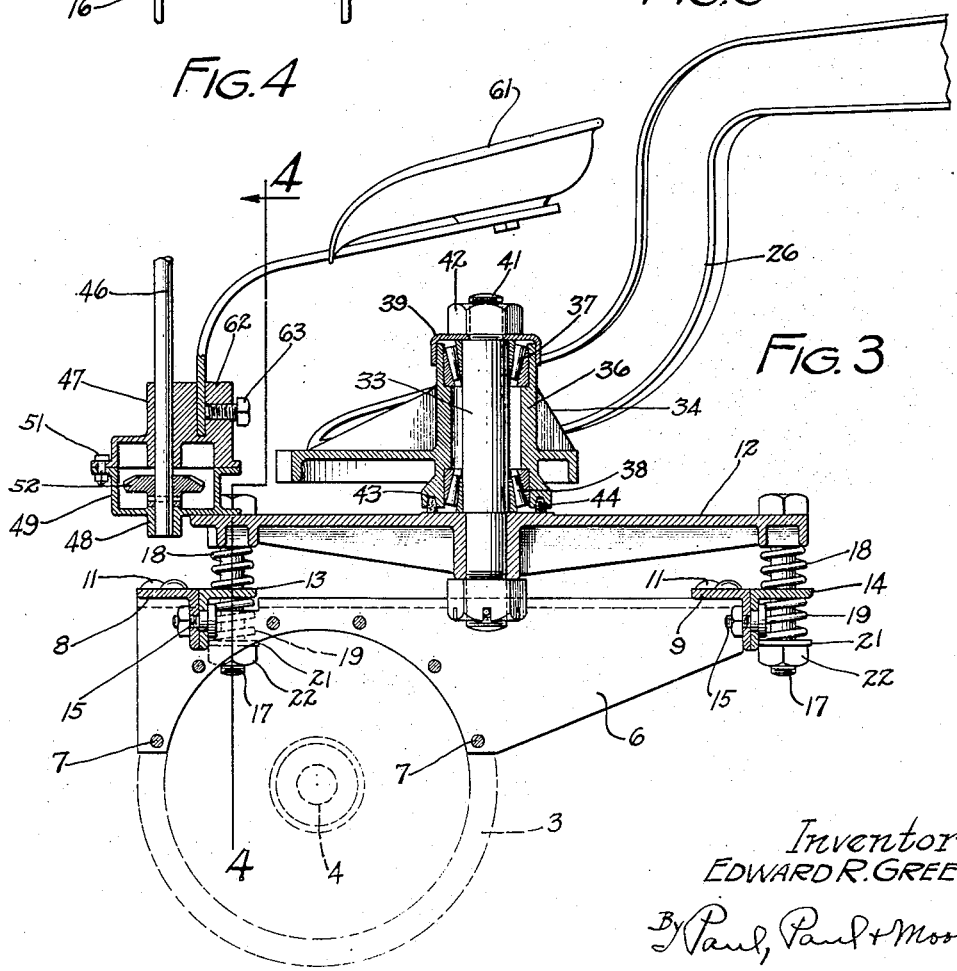
Figure 3 is a vertical sectional view on the line 3—3 of Figure 2.

The coupling means between the tractor and trailer includes a plate 12, yieldably and pivotally mounted upon the brackets 6, as shown in Figures 3, 4, and 5. The means provided for supporting the plate 12 upon the brackets 6, comprises supporting members 13 and 14, pivotally mounted upon the cross members 8 and 9, respectively, by means of shouldered pivots 15. The supporting members 13 and 14 are also preferably of angle iron construction, and the end portions of the depending webs are cut away, as indicated in Figures 4 and 5, so that the end portions 16 of the members 13 and 14 may overhang the brackets 6, as best shown in Figures 4 and 5. The end portions 16 are apertured to receive bolts 17, slidably mounted therein and having their upper ends received in suitable apertures provided in the plate 12. Suitable compression springs 18 are interposed between the end portions 16 of the supporting members 13 and 14 and the plate 12, and similar springs 19 are interposed between the lower faces of the end portions 16 and washers and nuts 21 and 22, respectively, provided upon the lower ends of the bolts 17. Thus, it will be noted that the plate 12 is yieldably and pivotally supported upon the brackets 6, the pivot studs 15 being mounted in axial alinement so that the plate 12 may oscillate laterally with respect to the tractor.

The trailer shown in the accompanying drawings, comprises the usual body 23 mounted upon the frame 24, having its rear portion borne by the usual carrying wheels 25 as shown in Figure 1. Diverging draft beams 26 having their intermediate portions pivotally connected to the upper forward portions 27 of the frame members 24 by means of a cross shaft 28, and the rear depending portions of the draft beams 26 are yieldably connected to the frame members 24 by means of a cross member 29, cushion springs 31 and bolts 32. (See Figures 1 and 2). The draft beams 26 are preferably formed as shown in Figure 1, so as to provide ample clearance for the rear traction wheels of the tractor, when turning sharp corners.

Figure 2:
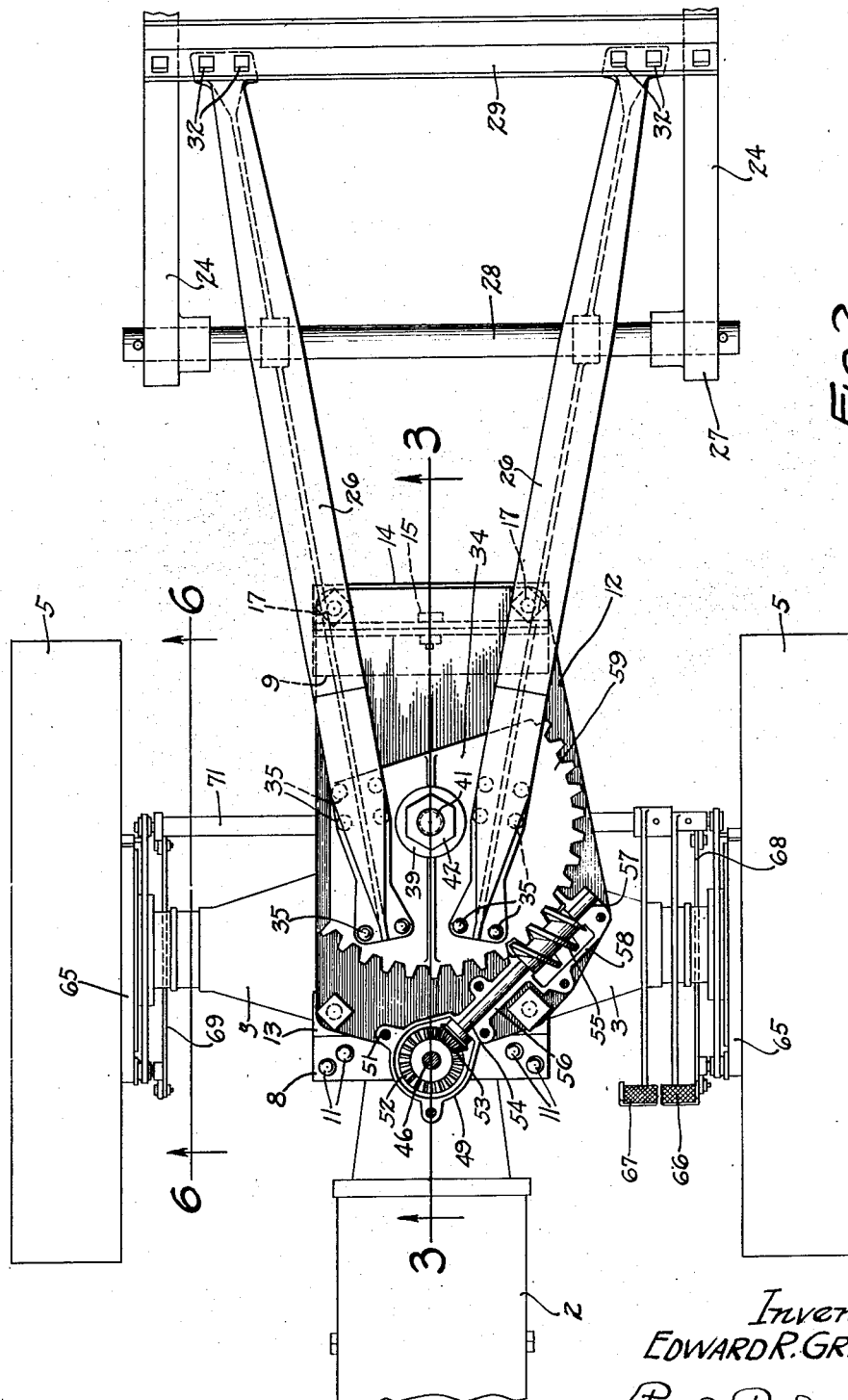
Figure 2 is an enlarged plan view of the rear portion of the tractor, showing the forward portion of the trailer connected therewith.

The means provided for pivotally connecting the forward ends of the diverging draft beams 26 to the plate 12 is best shown in Figure 3. A stud 33 is fixedly mounted in the plate 12 at a point rearwardly of the axis of the tractor axle 4. This stud extends upwardly and is engaged by a member 34, secured to the forward ends of the draft beams 26 by means of suitable rivets 35, as shown in Figure 2. The member 34 has a central hub 36, bored to loosely receive the stud 33. Anti-friction bearings 37 and 38 are provided at each end of the hub 36, and the inner races of these bearings snugly fit the stud 33 in the usual manner. A cap 39 is mounted upon the reduced threaded end portion 41 of the stud 33, and is secured thereto by means of a nut 42. The depending annular flange of the cap 39 fits over the upper end of the hub 36 to prevent dust and grit from entering the bearings at this point. An annular groove 43 is provided in the lower face of the hub 36 adapted to receive a suitable packing 44, which engages the upper face of the plate 12 and prevents dust and grit from entering the lower bearing.

The bearings 37 and 38 function as both radial and thrust bearings, the lower bearing 38 carrying the combined weight of both the load and the forward end of the trailer. It will also be noted that by thus connecting the trailer with the plate 12 of the tractor, the springs 18 will also act as a means for cushioning the tractor load. These springs in conjunction with the lower springs 19, also permit relative movement of the tractor with respect to the trailer frame so as to prevent straining and twisting of trailer frame, when traveling over comparatively rough ground.

The means provided for steering or guiding the tractor and trailer, when connected together, is shown in Figure 1, and consists of a steering wheel 45, terminally mounted upon a steering post 46, having its lower end rotatably mounted in bearings 47 and 48, provided in a split gear housing 49, as shown in Figure 3. The upper and lower sections of the gear housing 49 are secured together by suitable bolts 51.

A beveled gear 52 is secured to the steering post 46 within the gear housing 49, and meshes with a pinion 53 terminally secured to one end of a worm shaft 54, having a worm 55 mounted thereon adjacent the opposite end thereof. The shaft 54 is mounted in suitable bearings 56 and 57, provided in an extension 58 of the split gear housing 49. The worm 55 meshes with a gear segment 59, preferably integrally formed with the member 34 to which the forward ends of the diverging draft beams 26 are secured.

The steering mechanism above described, provides means for conveniently guiding the apparatus when in motion. This results because the steering post 46, bevel gear 52, pinion 53, shaft 54 and worm 55 are all mounted upon and secured to the plate 12 which, in turn, is secured to the tractor by means of the bolts 17, cross members 13 and 14 and the brackets 6. All of the above described parts, supported upon the plate 12, are yieldably mounted upon the tractor because of the springs 18 and 19, and these parts are locked against relative rotation with respect to the tractor because of the bolts 17. It therefore follows that when the worm 55 is rotated, by rotation of the steering wheel 45, the tractor, as a whole, will swing about the axis of the upright pivot pin 33, causing the apparatus to turn to one side or the other, depending, of course, upon the direction of rotation of the handwheel 45. An operator's seat 61 is secured to the upper rear section 62 of the split gear housing 49 by means of a set screw 63, and is positioned directly back of the steering wheel 45 so that the operator may conveniently guide the apparatus in the usual manner. The usual controls for controlling the operation of the tractor engine, and the clutch pedal, are not shown in the drawings, as these are of the usual type.

Each tractor wheel 5 may also be provided with a brake drum 64 and brake band 65, independently operable by means of brake pedals 66 and 67, respectively. The brake pedal 66 is connected with the left hand brake band 65 by a suitable connection 68, and the brake pedal 67 is operatively connected with the right hand brake band by a connection 69 and a sleeve or hollow shaft 71. These brakes facilitate turning as, for instance, if it is desired to turn the tractor to the right, the operator may manipulate the brake pedal 67 and retard the rotation of the tractor wheel 5 at the right hand side of the apparatus, and thereby cause the left hand wheel to swing about the right hand wheel. This is of particular advantage when it is necessary to turn the tractor while traveling in loose dirt or sand.

A suitable shoe or skid 72, preferably V-shaped in form, is detachably secured to the forward end of the tractor in place of the usual front wheels. This shoe ordinarily does not engage the ground, but, in the event the tractor passes over loose piles of dirt, the shoe 72 will engage such dirt or sand and spread or level it out sufficiently to permit the tractor and trailer to pass thereover. The shoe 72 also provides means for supporting the forward end of the tractor, should said forward end contact with the ground as, for example, when the tractor is turning sharp corners while traveling in loose sand or gravel, or when the trailer is disconnected from the tractor.

The novel tractor hitch featured in this invention is so designed that when the tractor and trailer are connected together, as shown in Figure 1, the apparatus may be operated as a four-wheeled vehicle. Because of the tractor being swung or pivoted about the axis of the upright stud 33, the apparatus may by easily controlled and guided while passing through loose sand and gravel, which is an advantage over apparatus of this kind now in use, as it is very difficult to steer or guide a tractor having four wheels when pulling a heavily loaded trailer, because the front wheels of the tractor have a tendency to slide forwardly over the surface of the ground or through the latter, when traveling through loose dirt or ground. The location of the pivot 33 is such that when the trailer is connected with the tractor, the weight of the forward end of the trailer will counterbalance the weight of the forward end of the tractor. The steering wheel 45 and its associated mechanism provides means for readily steering the apparatus when traveling over ordinary road surfaces, and the brake bands 65 and pedals 66 and 67 provide means for steering the tractor when traveling in very loose sand or gravel.

I claim as my invention:

1. The combination with a tractor having rear traction wheels and a semi-trailer, of means for coupling the forward end of the trailer to the tractor, said coupling means comprising an element yieldably and non-rotatably supported upon the tractor, an upright pivot mounted in said element and located rearwardly of the axis of said traction wheels so that the weight of the trailer on said element will counterbalance the weight of the forward end of the tractor, whereby the tractor front wheels may be dispensed with and the tractor and trailer operated as a four-wheeled unit, said element being mounted for oscillatory movement on a horizontal axis disposed lengthwise of the tractor.

2. The combination with a tractor having rear traction wheels and a semi-trailer, of means for coupling the forward end of the trailer to the tractor, said coupling means comprising an element resiliently mounted upon the tractor and adapted for universal tilting movement with respect thereto, a pivot pin in said element, a coupling member secured to the forward end of the trailer and adapted to engage said pivot pin, said pin and element being located rearwardly of the axis of said traction wheels so that the weight of the trailer on said element will substantially counterbalance the weight of the forward end of the tractor, whereby the tractor front wheels may be dispensed with, and means for controlling turning movement of the tractor and trailer comprising a gear segment secured to the trailer coupling member and a worm supported upon said resiliently mounted element.

3. The combination with a tractor having a drive axle and a semi-trailer, of means for coupling the trailer to the tractor, said coupling means comprising an element resiliently mounted upon the tractor and having an upright pivot pin therein, a member secured to the forward end of the trailer and engageable with said pivot pin, said pivot pin being located rearwardly of the tractor drive axle so as to cause the weight of the trailer to substantially counterbalance the weight of the forward end of the tractor, whereby the tractor front wheels may be dispensed with, a gear segment on the trailer member, a worm mounted on said resilient element and engaging said gear segment, and means for operating said worm to relatively swing the tractor to guide the apparatus.

4. The combination with a tractor having rear traction wheels, and a semi-trailer, of means for coupling the trailer to the tractor comprising a supporting structure secured to the tractor housing, supporting members pivotally connected with said supporting structure and adapted to oscillate in a plane transversely of the tractor, studs slidably engaged with the end portions of said supporting members, a plate engaged with the upper ends of said studs and having spring elements interposed between it and said supporting members to provide a resilient connection between the plate and said members, a pivot pin secured in said plate and located rearwardly of the axis of the tractor drive wheels whereby the front wheels of the tractor may be dispensed with, a gear segment secured to the forward end of the trailer frame and having a hub adapted to receive said pivot pin to provide a pivotal connection between the tractor and trailer, a worm mounted on said plate and meshing with said gear segment, and means for operating said worm to relatively swing the tractor with respect to the trailer to control turning movement of the apparatus.

5. The combination with a tractor having rear traction wheels, and a semi-trailer, of means for coupling the trailer to the tractor comprising a supporting structure secured to the tractor housing, supporting members having intermediate portions pivotally connected with said supporting structure and adapted to oscillate in a plane transversely of the tractor, studs slidably engaged with the end portions of said supporting members, a plate engaged with the upper ends of said studs and having spring elements interposed between it and said supporting members to provide a resilient connection between the plate and said members, a pivot pin secured in said plate and located rearwardly of the axis of the tractor drive wheels whereby the front wheels of the tractor may be dispensed with, a gear segment secured to the forward end of the trailer frame and having a hub adapted to receive said pivot pin to provide a pivotal connection between the tractor and trailer, a worm mounted on said plate and meshing with said gear segment, and means also supported upon said plate for operating said worm to relatively swing the tractor with respect to the trailer to control turning movement of the apparatus.

6. The combination with a tractor having rear traction wheels and a trailer, of means for coupling the forward end of the trailer to the tractor, said coupling means comprising a plate yieldably and non-rotatably mounted upon a rearward extension of the tractor and adapted for rocking movement about an axis disposed lengthwise of the tractor, an upright pivot secured in said plate and adapted to be engaged with the forward end of the trailer, said plate and pivot being situated rearwardly of the axis of the traction wheels of the tractor so that the weight of the trailer on said plate will substantially counterbalance the weight of the forward end of the tractor whereby the tractor front wheels may be dispensed with, and a steering mechanism for relatively swinging the body of the tractor to effect turning movement of the apparatus.

7. In an apparatus of the class described, a trailer having forwardly extending draft members, an upright bearing at the forward ends thereof, a power unit having a drive axle provided with traction wheels, brackets on the power unit extending rearwardly of the axis of said traction wheels, rockers mounted on said brackets, a coupling plate mounted on said rockers and adapted for universal tilting movement thereon, and an upright pivot on said plate adapted to be received in the bearing of the trailer draft members, said pivot being situated rearwardly of the axis of said drive wheels whereby the weight of the forward end of the trailer will substantially counterbalance the weight of the forward end of the power unit.

8. In an apparatus of the class described, a trailer having forwardly extending draft-members, an upright bearing at the forward ends thereof, a two-wheeled power unit having a drive axle provided with traction wheels, brackets on the power unit extending rearwardly of the axis of said drive wheels, rockers mounted on said brackets and swingable on an axis disposed lengthwise of the power unit, a coupling plate mounted on said rockers and adapted for universal tilting movement thereon, and an upright pivot on said plate adapted to be received in the bearing of the trailer draft members, said pivot being situated rearwardly of the axis of said drive wheels whereby the weight of the forward end of the trailer will substantially counter-balance the weight of the forward end of the power unit.

9. In an apparatus of the class described, a trailer having forwardly extending draft members, an upright bearing at the forward ends thereof, a two-wheeled power unit having a drive axle provided with traction wheels, brackets on the power unit extending rearwardly of the axis of said drive wheels, rockers mounted on said brackets and swingable on an axis disposed lengthwise of the power unit, a coupling plate mounted on said rockers and adapted for universal tilting movement thereon, an upright pivot on said plate adapted to be received in the bearing of the trailer draft members, said pivot being situated rearwardly of the axis of said drive wheels whereby the weight of the forward end of the trailer will substantially counterbalance the weight of the forward end of the power unit, and a steering mechanism carried on said coupling plate.

10. In an apparatus of the class described, a trailer, a bearing at the forward end thereof, a power unit provided with traction wheels, rearwardly extending brackets on the power unit, rockers mounted on said brackets and adapted for oscillatory movement about an axis disposed lengthwise of the power unit, a pivot pin supported upon said rockers and adapted to be received in the trailer bearing, and means permitting universal movement of said pivot pin on said rockers, said pivot pin being situated rearwardly of the axis of said traction wheels whereby the weight of the forward end of the trailer will substantially counterbalance the weight of the forward end of the power unit.

11. In an apparatus of the class described, a trailer, a bearing at the forward end thereof, a power unit provided with traction wheels, rearwardly extending brackets on the power unit, rockers mounted on said bracket and adapted for oscillatory movement about an axis disposed lengthwise of the power unit, a member movably mounted upon said rockers, a pivot pin secured to said member and adapted to be received in the trailer bearing, means permitting universal movement of said member upon the rockers, said pivot pin being situated rearwardly of the axis of said traction wheels whereby the weight of the forward end of the trailer will substantially counterbalance the weight of the forward end of the power unit, and a steering mechanism supported upon said member for controlling turning movement of the apparatus.

In witness whereof I have hereunto set my hand this 24th day of September 1928.

EDWARD R. GREER.